(12) United States Patent
Blitzer et al.

(10) Patent No.: US 7,593,878 B2
(45) Date of Patent: Sep. 22, 2009

(54) METHOD OF CONSTRUCTING AN INVESTMENT PORTFOLIO AND COMPUTING AN INDEX THEREOF

(75) Inventors: David M. Blitzer, New York, NY (US); Srikanta Dash, Jersey City, NJ (US)

(73) Assignee: Standard & Poor's Financial Services LLC, New York, NY (US)

( * ) Notice: Subject to any disclaimer, the term of this patent is extended or adjusted under 35 U.S.C. 154(b) by 306 days.

(21) Appl. No.: 11/435,924

(22) Filed: May 18, 2006

(65) Prior Publication Data

US 2007/0271196 A1    Nov. 22, 2007

(51) Int. Cl.
*G06Q 40/00* (2006.01)
(52) U.S. Cl. .......................... 705/35; 705/36
(58) Field of Classification Search .............. 705/35–36
See application file for complete search history.

(56) References Cited

U.S. PATENT DOCUMENTS

| | | | |
|---|---|---|---|
| 5,297,032 | A | 3/1994 | Trojan et al. |
| 5,784,696 | A | 7/1998 | Melnikoff |
| 5,819,238 | A | 10/1998 | Fernholz |
| 5,946,666 | A | 8/1999 | Nevo et al. |
| 5,978,778 | A | 11/1999 | O'Shaughnessy |
| 6,035,286 | A | 3/2000 | Fried |
| 6,061,663 | A | 5/2000 | Bloom et al. |
| 6,064,985 | A | 5/2000 | Anderson |
| 6,175,824 | B1 | 1/2001 | Breitzman |
| 6,839,685 | B1 | 1/2005 | Leistensnider et al. |
| 6,922,677 | B1 | 7/2005 | Sperandeo |
| 2002/0007329 | A1 | 1/2002 | Alcaly et al. |
| 2004/0181477 | A1 | 9/2004 | Sauter et al. |
| 2005/0010481 | A1 | 1/2005 | Lutnick et al. |
| 2005/0075961 | A1 | 4/2005 | McGill |
| 2005/0171884 | A1 | 8/2005 | Arnott |
| 2005/0246255 | A1 | 11/2005 | Rousseau et al. |
| 2006/0015433 | A1 | 1/2006 | Arnott et al. |

(Continued)

FOREIGN PATENT DOCUMENTS

WO    WO 98/44444  A1    10/1998

OTHER PUBLICATIONS

The FTSE Global Style Index Series Ground Rules, FTSE The Index Company, 35pp, Version 1.1 Sep. 2002.

(Continued)

*Primary Examiner*—Thu Thao Havan
(74) *Attorney, Agent, or Firm*—Rothwell, Figg, Ernst & Manbeck, PC (57) ABSTRACT

A method for selecting investment assets for a portfolio is based upon a score derived for each asset which is indicative of its style, for example, whether a stock is predominantly a growth or a value stock. Different sets of score factors are designated for assessing an asset's score with respect to a first characteristic, or style, indicated by one set of score factors and with respect to a second characteristic, or style, indicated by the second set of factors. Based on the asset's score from one set of score factors relative to its score from a second set of score factors, the asset's predominant character can be determined. Also, an index for a number of assets can be computed in which each constituent asset's weight is determined by the asset's score with respect to one style or another.

37 Claims, 2 Drawing Sheets

U.S. PATENT DOCUMENTS

2006/0041489 A1  2/2006  Arnott
2006/0059078 A1  3/2006  Courbois et al.
2006/0100950 A1  5/2006  Hecht

OTHER PUBLICATIONS

Russell U.S. Equity Indexes, Construction and Methodology, 28pp, Jul. 2005.

MSCI Global Value and Growth Index Series, MSCI Methodology Book, 30pp, Sep. 2005, Morgan Stanley Capital International Inc., copyright 2003.

Methodology Overview, Dow Jones Wilshire U.S. Style Indexes, Dow Jones & Company, Inc, and Wilshire Associates Incorporated, 2pp, Jun. 2005.

Equity Style Investing and the Salomon Smith Barney World Equity Style Indices, Quantitative Research—Equity Index, pp. 1-156, Jan. 2000.

Babin, Charles E., "Dividends matter", General Trade, Forbes, p. 254 (2 pages), (Jul. 1997).

Equity income, "Does it Pay to go for yield in selecting stocks? It hasn't paid recently", General Trade, Forbes, p. 216 (3 pages), (Nov. 1995).

Keating, Peter, "The Money 30: forget the Dow: here's an index that tracks the stocks of the future", Money, vol. 25: 79-82+ (16 pages), (Jun. 1996).

Kuhn, Susan E., "Stocks: Bear Market Ahead?"; Fortune, vol. 130: 48-51 (8 pages), (Dec. 1994).

Schwab, Charles, "Schwab introduces Analytics Fund; utilizes quantitative techniques to seek above-market returns", Business Wire, http://toolkit.dialog.com/intranet/cgi/present (May 21, 1996) (9 pages).

"Value Line Funds Closing Prices for May 13, 1998", http://web.archive.org/web/19980514065754/valueline.com/vlfund.html (2 pages).

Sorensen, E.H., "The Salomon Smith Barney World Equity Style Indices," SalomonSmithBarney, 20 pages (Oct. 12, 1999).

METHOD OF CONSTRUCTING AN INVESTMENT PORTFOLIO AND COMPUTING AN INDEX THEREOF

BACKGROUND AND SUMMARY

An index is a collection or portfolio of stocks, bonds or other investments (referred to herein as "investment assets" or "assets") selected to represent a particular segment of a market. The representative assets selected defined the investments in the index. Methodologies for administering indices include rules for weighting the constituents in the index and rules for maintenance of the index when constituents of the index change. Indices can be defined by the kinds of investments included, such as stock indices, bond indices, and commodity indices, etc. Indices can also be defined by the schemes used to weight the constituents of the index, such as capitalization ("cap") weighted, price weighted, and equal weighted. Exemplary indices used in the market include the Standard & Poor's ("S&P") 500, the S&P Global 1200, the S&P/Citigroup indices, MSCI's indices, FTSE's indices, and Russell's indices.

In a capitalization weighted index, each constituent stock's weight in the index is its capitalization compared to the sum of all the stocks' capitalizations. The simplest capitalization weighted index can be thought of as a portfolio consisting of all the available shares of the stocks included in the index. While one might track this portfolio's value in dollar terms, it would probably be an unwieldy number—the S&P 500 market value is roughly $11 trillion. Rather than deal with ten or more digits, the figure is scaled to a more easily handled number, currently around 1300. The scaling is done by dividing the portfolio market value by a factor, usually called the divisor.

An index is not exactly the same as a portfolio. For instance, when a stock is added to or deleted from an index, the index level should not jump up or drop down. A portfolio's value, on the other hand, would usually change if stocks are swapped in and out. To assure than the index's value, or level, does not change when stocks are added or deleted, the divisor is adjusted to offset the change in market value of the index. Thus the divisor plays a critical role in the index's ability to provide a continuous measure of market valuation in the face of changes to the stocks included in the index. In a similar manner, some corporate actions which cause changes in the market value of the stocks in an index should not be reflected in the index level. Adjustments can be made to the divisor to eliminate the impact of these corporate actions.

Investment index solutions provide a basis for categorizing and grouping investment assets (e.g., stocks) according to predefined characteristics of the assets. For example, assets may be characterized and grouped in accordance with each asset's "style"—that is, whether the asset is characterized as a value investment or a growth investment. A value stock is a stock that is considered undervalued because it tends to trade at a lower price relative to it's fundamentals (i.e. dividends, earnings, sales, etc.). Common characteristics of such stocks include a high dividend yield, low price-to-book ratio, and/or low price-to-earnings ratio. A growth stock is the stock of a company whose earnings and/or sales are expected to grow at an above average rate relative to the market. Size of the underlying company is another example of a characteristic style.

Style index solutions should address two distinct needs. The first is for exhaustive style indices that can effectively form the basis for index funds and derivatives, providing broad, cost-efficient exposure to a certain style segment. The second need is for narrow, style-pure indices that provide a pure style return series, and serve as the basis for style-concentrated investment vehicles or 'style spread' products.

There should also be consistency between the style definition used in index-driven, returns-based style analysis and style definitions used at the stock level, in equity research and holdings-based style analysis.

This disclosure describes a comprehensive style index solution that includes building separate style and pure-style indices and provides a consistent set of stock-level style scores and style indices.

In one embodiment, an asset's value characteristics and growth characteristics are measured in separate dimensions using factors that have been found to be indicative of the asset's growth or value tendencies.

The Style Index series divides the complete market capitalization of a group of investment assets approximately equally into value and growth indices. This series covers all stocks in a parent index universe, and uses the conventional, cost-efficient market capitalization-weighting scheme. Any asset that does not fall into pure style baskets (e.g., pure growth or pure value) has its market capitalization distributed between value and growth indices.

The Pure Style Index series identifies approximately one third of the parent index's market cap as pure growth and one third as pure value. There are no overlapping stocks, and these indices do not have the size bias induced by market capitalization weighting. Rather, stocks are weighted in proportion to their relative style attractiveness.

Style-based Indices can be available for various style subsets of wider indices, such as the S&P 500, S&P MidCap 400, S&P SmallCap 600, and their various combinations.

According to one embodiment, scores will be reviewed and indices rebalanced every December so as to coincide with the real world portfolio review process, which typically relies on year-end evaluations.

In investigating and evaluating industry practices on issues surrounding style index construction and usage, two defining trends have emerged in recent years.

1. Equity style indices should address two distinct sets of market participant needs.

A. The first need is for conventional broad-based, exhaustive style indices that can effectively form the basis for index funds and exchange-traded derivatives, providing cost-efficient exposure to a certain style segment. These indices are market capitalization-weighted because this weighting scheme is cost-efficient, and provides mean variance-optimized exposure to the market.

B. The second need is for narrower, style-pure indices which provide quantitative analysts and performance analysts with a pure style return series, while also providing the basis for style-concentrated investment vehicles and style spread-based structured products. These indices' returns should not suffer from size bias induced by market capitalization weighting, but rather should reflect the structure of active managers' portfolios, which hold stocks in proportion to their relative attractiveness.

While a variety of indices cater to the first need, the second need is clearly not satisfied by existing style indices from major index providers.

2. Use of multiple measures of equity risk and more sophisticated quantitative techniques has become the norm in style analysis.

Increased availability of financial databases and a proliferation of portfolio risk software have resulted in style being analyzed across multiple risk factors, in contrast to the simple three-factor risk measure in the Fama-French world.

Returns-based style analysis is increasingly being supported by holdings-based style analysis, making it imperative to have inter-operability between the style definitions being used at the stock level and at the benchmark construction level.

While style indices and holdings or returns-based style analysis tools are readily available, there is no consistency of style definition used for leading style indices and style definitions used at the stock level.

Taking into account the above-described trends, the goals of an index design methodology in accordance with an embodiment of the present invention are as follows:

A group of candidate assets are assembled, and the value and growth characteristics of each assets are evaluated at the stock level along separate dimensions using multiple factors. Using the results of this evaluation, two sets of complementary index series are constructed:

Style Index series—This series divides the complete market capitalization of the group of candidate assets approximately equally into value and growth indices while limiting the number of stocks that overlap between them. This series is to be exhaustive (i.e., cover all assets (e.g., stocks) in the candidate asset group) and use the conventional, cost-efficient market cap-weighting scheme.

Pure Style Index Series—This series is based on identifying a predefined portion—for example, approximately a third—of the market capitalization of the candidate group as pure growth and a third as pure value. There will be no overlapping stocks, and stocks are weighted by their style attractiveness.

DETAILED DESCRIPTION

The algorithms described below involve computations that are often complex and repetitive. Moreover, the algorithms involve accessing, storing, and manipulating much data. Accordingly, it will be readily understood that the algorithms may be performed by an appropriately programmed computer microprocessor in conjunction with suitable and sufficient electronic storage media that is accessible by the microprocessor. Furthermore, the algorithms may be embodied in executable software stored on computer-readable storage media.

Evaluating Value and Growth At the Stock Level—Style Factors:

The style indices measure value and growth along two separate dimensions, with a plurality of factors used to measure the character of an asset from a value standpoint and a plurality of factors used to measure the character of an asset from a growth standpoint. In one implementation of the methodology described herein, four factors are used to measure value character and three factors are used to measure growth character. A representative list of factors which can be used is outlined in the table below.

| Growth Factors | Value Factors |
| --- | --- |
| 5-Year* Earnings per Share ("EPS") Growth Rate | Book Value to Price Ratio |
| 5-Year* Sales per Share Growth Rate | Cash Flow to Price Ratio |
| 5-Year* average, annual Internal Growth Rate (Internal Growth Rate ("IGR") = Return on Equity ("ROE") × Earnings Retention Rate) | Sales to Price Ratio<br>Dividend Yield |

*Periods other than 5 years (e.g., 2 years or 3 years) can be used alternatively.

Alternative expressions for the Internal Growth Rate ("IGR") include:

$$IGR = ROE \times (1 - \text{Payout Ratio})$$

$$IGR = ROE - \text{Dividends}/\text{Shareholders Equity}$$

$$IGR = \frac{(\text{Retained Earnings(Current Year)} - \text{Retained Earnings (Last Year)})}{(\text{Shareholders Equity})}$$

The list of factors that can be considered determinant of either value or growth characteristics is not limited, and there is very little agreement among researchers or analysts about which set of variables is most important. The factors listed above and the manner of evaluating style scores at the stock level can be the same as that used for the S&P/Citigroup benchmark style index series. The factors were picked during the development of the S&P/Citigroup style indices based on their ability to cluster stocks across several markets into growth and value baskets. Other growth factors which can be used include 5-year (or other period) book value per share growth rate, 5-year (or other period) average annual EPS growth rate, ROE, ROA ((net income—preferred dividends—after tax interest expense)/last year's total assets), dividend payout ratio, long term debt to common equity ratio, I/B/E/S 5-year (or other period) EPS growth rate estimate, and the forward sales estimate. Another value factor which can be used includes EPS to price per share ratio. (See "Equity Style Investing and the Salomon Smith Barney World Equity Style Indices," January, 2000.) While the choice of the very same factors offers us the advantage of consistency, more importantly, we believe that once style is determined using multiple robust factors, the addition or deletion of a factor does little to change the overall profile of the value and growth baskets.

Style Scores:

In an embodiment of the methodology, a plurality of investment assets (e.g., stocks) are assembled to define a candidate group of assets. The candidate group may comprise a predefined group of assets, such as all companies in the S&P/Citigroup BMI universe or the S&P Composite 1500. Raw values are calculated for each asset in the candidate group using selected growth and value factors, such as the factors listed in the table above. These raw values may then be standardized to place all scores on a comparable scale by dividing the difference between each asset's raw score and the mean of the entire set by the standard deviation of the entire set. A Growth Score for each asset is computed based on the standardized scores for each of the selected growth factors, for example as the average of the standardized values of the selected growth factors. Similarly, a Value Score for each asset is computed based on the standardized scores for each of the selected value factors, for example as the average of the standardized values of the selected value factors. As an alternative to taking the average of the scores, the scores can be combined in any way that will result in a score that will differentiate between stocks of different characteristics. For example, the scores can simply be summed, or different weights can be assigned to different scores.

The simple averaging process assumes each factor is equally important. Different factors will clearly have different discriminating powers over time, but the equal weighting approach is chosen to meet the design goal of simplicity.

Figure 1:
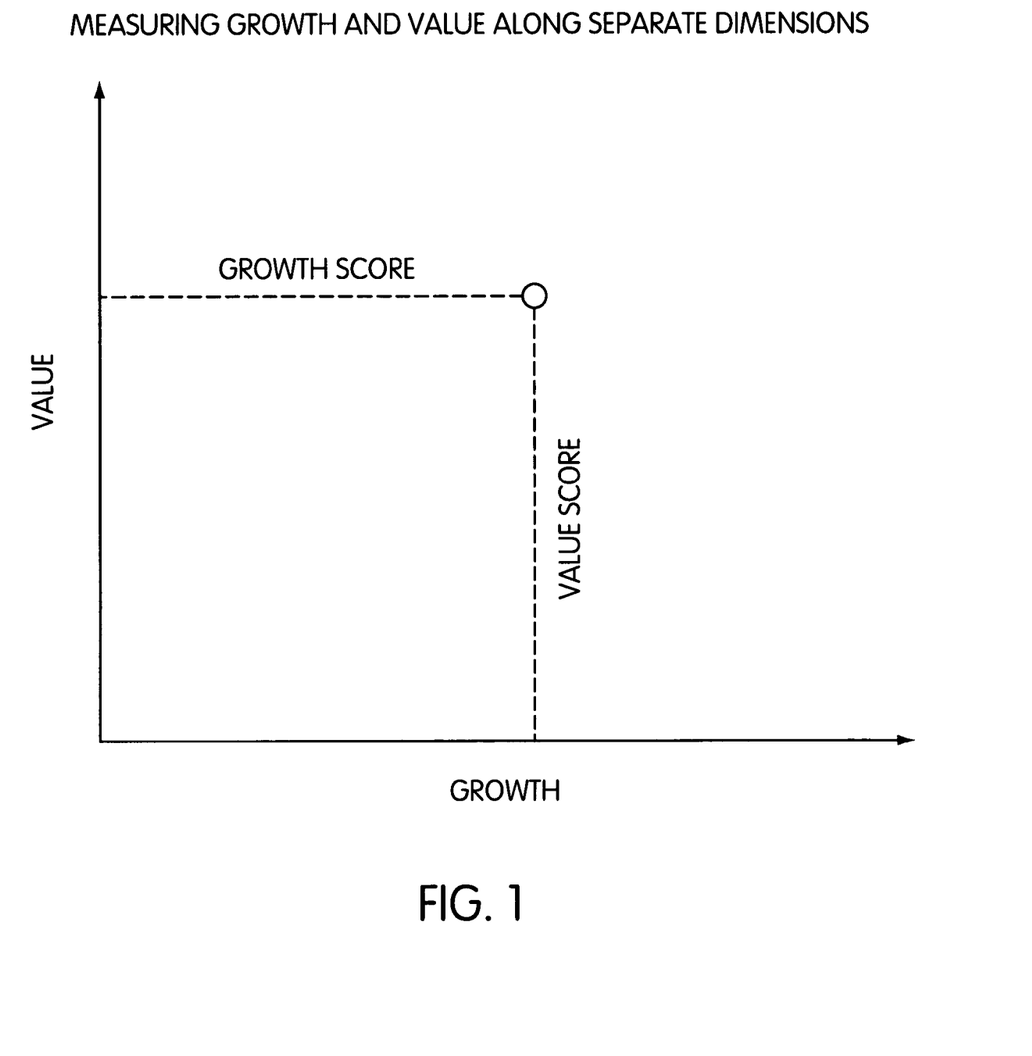
FIG. 1 graphically represents measurements of growth and value characteristics for an asset (e.g., stock) along separate dimensions.

At the end of this step each asset (e.g., stock) has a Growth Score and a Value Score, as shown in FIG. 1, with growth and value being measured along separate dimensions.

For Stock x (assuming three growth factors and four value factors):

$G_{i,X}$=Standardized value of Growth Factor i for stock x, i=1 to 3.

$V_{j,X}$=Standardized value of Value Factor j for stock x, j=1 to 4.

$SG_X$=Growth Score of $X=\frac{1}{3}(G_{1,X}+G_{2,X}+G_{3,X})$ $SV_X$=Value Score of $X=\frac{1}{4}(V_{1,X}+V_{2,X}+V_{3,X}+V_{4,X})$ Establishing Style Baskets:

Stocks within a group of candidate assets—for example, within each parent index—are ranked based on growth and value scores. The assets can be ranked in ascending order, with the stock having the lowest growth score having a rank of 1 in the growth ranking and the stock having the lowest value score having a rank of 1 in the value ranking. Alternatively, the stocks can be ranked in descending order, with the stock having the highest growth score having a rank of 1 in the growth ranking and the stock having the highest value score having a rank of 1 in the value ranking. Assuming the stocks are ranked in descending order, a stock with a high Growth Score would have a higher Growth Rank, while a stock with a low Value Score would have a lower Value Rank. (For example, the S&P MidCap 400 constituent with the highest Value Score would have a Value Rank of 1, while the constituent with the lowest would have a Value Rank of 400.)

For each asset, its Growth Rank is Divided by its Value Rank to compute a rank ratio. Alternatively, a rank ratio can be computed as the asset's Value Rank divided by its Growth Rank. The candidate assets are then sorted in ascending (or alternatively, descending) order of their Rank Ratio. Assuming an ascending sorting of Rank Ratios calculated as Growth Rank divided by Value Rank, the stocks at the top of the list (i.e., those assets having the smallest values for their Rank Ratio) have a higher Growth Rank (or high Growth Score, that is, those assets having a low Growth Rank number, e.g., a Growth Rank of 1-10, for a descending order ranking of Growth Scores) and a lower Value Rank (or low Value Score, that is, those assets having a high Value Rank number, e.g., a Value Rank of 390-400 (in a 400-asset candidate pool), for a descending order ranking of Value Scores), and therefore exhibit pure growth characteristics. The assets at a predefined top portion of the list, for example the top 33% of the total market capitalization of the candidate pool, are designated as the Pure Growth basket. The assets at the bottom of the list have a higher Value Rank (and Value Score, that is, those assets having a low Value Rank number, e.g., a Value Rank of 1-10, for a descending order ranking of Value Scores) and a lower Growth Rank (and Growth Score, that is, those assets having a high Growth Rank number, e.g., a Growth Rank of 390-400 (in a 400-asset candidate pool), for a descending order ranking of Growth Scores), and therefore exhibit pure value characteristics. The assets at a predefined bottom portion of the candidate pool, for example the bottom 33% of the total market cap of the index, are designated the Pure Value basket.

The stocks in the middle of the list have neither pure growth nor pure value characteristics. The distribution of the candidate pool into pure style regions according the embodiment described above as illustrated in FIG. 2.

Figure 2:
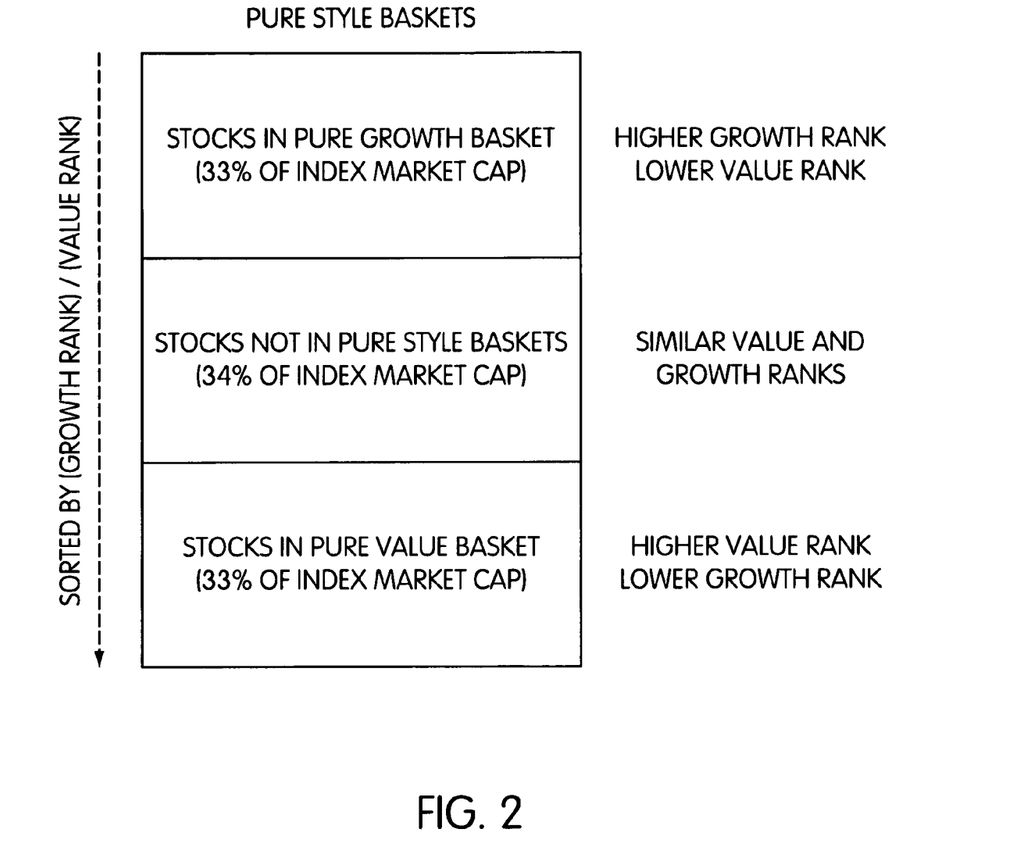
FIG. 2 graphically represents the division of a candidate group of assets into pure growth and pure value categories according to an implementation of the invention.

As can be readily appreciated by those of ordinary skill in the art, whether the Pure Growth and Pure Value assets will be encompassed by the top or bottom portion of the assets listed according to their rank ratio, will depend on (1) whether the assets are first ranked in ascending or descending order of their Growth and Value scores; (2) whether the rank ratio is computed as the asset's Growth Score divided by its Value Score or vice versa; and (3) whether the assets are listed in ascending or descending order of rank ratio.

Constructing Indices

As an example of a capitalization-weighted index, the formula to calculate the S&P 500 is:

$$\text{Index Level} = \frac{\sum_i P_i \times Q_i}{\text{Divisor}} \quad (1)$$

The numerator on the right hand side is the price $P_i$ of each stock i in the index multiplied by the number of shares $Q_i$ used in the index calculation. This is summed across all the stocks in the index. The denominator is the divisor. If the sum in the numerator is $11 trillion and the divisor is $8.469 million, the index level would be 1300, close to the current levels of the S&P 500.

Adjustments to Share Counts

Market cap-weighted indices may be "float adjusted"—meaning the number of shares outstanding is reduced to exclude closely held shares from the index calculation, because such shares are not available to investors. Thus, each stock is adjusted by calculating an Investable Weight Factor ("IWF"), which is the percentage of total shares outstanding that are included in the index calculation. When the index is calculated using equation (1), the variable $Q_i$ is replaced by the product of outstanding shares and the IWF:

$$Q_i = IWF_i \times \text{Total Shares}_i \quad (2a)$$

At times there are other adjustments made to the share count to reflect foreign ownership restrictions or to adjust the weight of a stock in an index. These are combined into a single multiplier in place of the IWF in equation (2a). In combining restrictions it is important to avoid unwanted double-counting. Let FA represent fraction of shares eliminated due to float adjustment, FR represent the fraction of shares excluded for foreign ownership restrictions, and IS represent the fraction of total shares to be excluded based on the combination of FA and FR.

If $FA > FR$ then $IS = 1 - FA$, \quad (3a)

If $FA < FR$ then $IS = 1 - FR$ \quad (3b)

and equation (2a) can be written as:

$$Q_i = IS_i \times \text{Total Shares}_i \quad (2b)$$

Divisor Adjustments

The key to index maintenance is the adjustment of the divisor. Index maintenance—reflecting changes in shares outstanding, capital actions, addition or deletion of stocks to the index—should not change the level of the index. For example, if the S&P 500 closes at 1307, and, after the market close, one stock is replaced by another, the index should open at 1307 the next morning if all the opening prices are the same as the previous day's closing prices. This is accomplished with an adjustment to the divisor.

Equation (1) is expanded to show the stock being removed, stock r, separately from the stocks that will remain in the index:

$$Index\ Level_{t-1} = \frac{\left(\sum_i P_i \times Q_i\right) + P_r Q_r}{Divisor_{t-1}} \quad (4)$$

Note that the index level and the divisor are now labeled for the time period, t-1 and that we are ignore the IWF and adjustments to the share counts. After stock r is replaced with stock s, the equation will read:

$$Index\ Level_{t-1} = \frac{\left(\sum_i P_i \times Q_i\right) + P_s Q_s}{Divisor_t} \quad (5)$$

However, by design Index Level$_{t-1}$ is equal to Index Level$_t$. Combining equations (4) and (5) and re-arranging, the adjustment to the Divisor can be determined from the index market value before and after the change:

$$\frac{\left(\sum_i P_i \times Q_i\right) + P_r Q_r}{Divisor_{t-1}} = Index\ Level = \frac{\left(\sum_i P_i \times Q_i\right) + P_s Q_s}{Divisor_t} \quad (6)$$

For shorthand, let the numerator of the left hand fraction be called MV$_{t-1}$ for the index market value at (t-1), and let the numerator of the right hand fraction be called MV$_t$ for market value at time t. Now, MV$_{t-1}$, MV$_t$ and Divisor$_{t-1}$ are all known quantities. Given these values the new divisor that will keep the index level constant when stock r is replaced by stock s is calculated as:

$$Divisor_t = (Divisor_{t-1}) \times \frac{MV_t}{MV_{t-1}} \quad (7)$$

As discussed below, various index adjustments result in changes to the index market value. When these adjustments occur, the divisor is adjusted as shown in equation (7).

In some implementations, including the computer implementation of the index calculations, the divisor adjustment is calculated in a slightly different, but equivalent, format where the divisor change is calculated by addition rather than multiplication. This alternative format is defined here. Rearranging equation (1) and using the term MV (market value) to replace the summation gives:

$$Divisor = \frac{MV}{Index\ Level} \quad (8)$$

When stocks are added or deleted from an index, there is a corresponding increase or decrease in the index's market value. This increase or decrease in the market value of the stocks being added less the market value of those stocks deleted; define CMV as the change in market value. Recalling that the index level does not change, the new divisor is defined as:

$$Divisor_{New} = \frac{MV + CMV}{Index\ Level} \quad (9)$$

or $$Divisor_{New} = \frac{MV}{IndexLevel} + \frac{CMV}{IndexLevel} \quad (10)$$

However, the first term on the right hand side is simply the Divisor value before the addition or deletion of the stocks. This yields:

$$Divisor_{New} = Divisor_{Old} + \frac{CMV}{IndexLevel} \quad (11)$$

Note that this form is more versatile for computer implementations. With this additive form the second term (CMV/Index Level) can be calculated for each stock or other adjustment independently and then all the adjustments can be combined into one change to the Divisor.

Constructing Growth and Value Indices

As described earlier, one of the design goals is to construct a style index series that divides the complete market capitalization of the asset candidate pool approximately equally into value and growth indices, while limiting the number of stocks that overlap across both. This series is to be exhaustive (i.e., cover all stocks in the candidate pool), and is to use the conventional, cost-efficient market cap-weighting scheme.

The pure style baskets described above are natural starting points for the style indices' construction. We assign 100% of the market cap of a stock in the Pure Value basket to the Value Index and 100% of the market cap of a stock in the Pure Growth basket to the Growth Index.

The middle portion (e.g., 34% assuming ⅓ of the candidate pool is designated pure growth and ⅓ is designated pure value) of market capitalization consists of stocks that have similar growth and value ranks. Their market cap is distributed among the style indices based on their distances from the midpoint of the Pure Value basket and the midpoint of the Pure Growth basket. The midpoint of each pure style region is calculated as the average of Value Scores and Growth Scores of stocks in the pure style basket.

For Stock X, $W_{V,X}$=Percent of Market Capitalization of Stock X in Value Index $W_{G,X}$=Percent of Market Capitalization of Stock X in Growth Index $$W_{V,X}=D_{G,X}/(D_{G,X}+D_{V,X})$$

$$W_{G,X}=D_{V,X}/(D_{G,X}+D_{V,X})$$

$$W_{V,X}+W_{G,X}=1$$

$D_{G,X}$ and $D_{V,X}$ are Cartesian distances which represent how far asset X is from being a pure growth asset or a pure value asset, respectively. The algorithm for computation of $D_{G,X}$ and $D_{V,X}$ is shown below in Appendix I.

Further, from the practical point of view of constructing easily replicable baskets, it is essential to avoid very small fractions of a stock's market cap being in a particular style index. We therefore round the weights.

If $W_{V,X}>=0.8$, $W_{V,X}=1.0$ and $W_{G,X}=0$.

If $W_{G,X}>=0.8$, $W_{G,X}=1.0$ and $W_{V,X}=0$.

Based on backtest results, the total market cap is approximately equally divided among the value and growth indices. Preferably, no mathematical procedure is employed to force equal market cap for the value and growth indices, since price movements of constituent stocks would regardless result in inequality immediately following the reconstitution.

It is also worth noting that the assignment of the market cap of stocks not in pure style baskets to value and growth indices allows graduated moves, and avoids churning of stocks between indices at each reconstitution. Further, this procedure results in only a limited portion (e.g., 34%) of the market capitalization of the candidate pool distributed across both indices, thus limiting the overlap area and keeping the style indices manageably narrow.

The Growth or Value index is calculated following the usual market cap-weighted index methodology. For example, the Value Index for a candidate pool of assets, such as, for example, the S&P SmallCap 600 Value index, is calculated as follows:

$$\text{Index Level}_t = \frac{\text{Index Market Value}_t}{\text{Index Divisor}_t}$$

$$\text{Index Market Value}_t = \sum_{X=1}^{N} IWF_{X,t} \times \text{Index Shares}_{X,t} \times W_{V,X} \times \text{Price}_{X,t}$$

Where, $IWF_{X,t}$=Investable Weight Factor of stock X on date t (i.e., the proportion of a company's stock that is traded on the market as determined by well-known methods).

$\text{Index Shares}_{X,t}$=Shares used for stock X in parent index on date t.

$W_{V,X}$=Percent of market cap of stock X in Value Index, calculated as per previous section. This is calculated only once a year on the rebalance date, or is specified when a new stock is added between rebalance dates.

$\text{Price}_{X,t}$=Price used for stock X in parent index computation on date t N=Number of stocks in the candidate asset pool Value index on date t (note that N<600 in the S&P SmallCap 600).

Other style indices are constructed similarly. Corporate actions and index changes are implemented in the same manner as for market cap-weighted indices. These are summarized below. For the total return index series, dividends are reinvested in a manner similar to other divisor-based indices.

Constructing Pure Growth and Pure Value Indices

This series is based, in one embodiment, on identifying approximately one third of the market capitalization of the candidate pool as pure growth and one third of the market capitalization of the candidate pool as pure value. There are no overlapping stocks (or assets), and index constituents are weighted by their style scores. Therefore, the pure style baskets are the only regions of interest in constructing the pure style indices.

In one implementation of the present invention, the constituents of the pure value index are all stocks for which $W_V=1$ and SV is greater than a specified minimum value score. Similarly, the starting universe for the pure growth index is stocks for which $W_G=1$ and SG> a specified minimum growth score. In other words, all constituents of the pure value basket, except those with the lowest value scores, are members of the pure value index. Similarly, all constituents of the pure growth basket, except those with the lowest growth scores are members of the pure growth index. In one implementation, in which the candidate pool is divided into thirds, with one third of the rank ratio spectrum comprising the pure growth assets and another third of the rank ratio spectrum comprising the pure value assets, the specified minimum standardized score is 0.25. A specified minimum value of 0.25 strikes a reasonable balance between the goals of having a sufficient number of assets in the growth and value indices while avoiding assets that are barely pure growth or barely pure value. Other schemes may accomplish the same goals, for example dividing the candidate pool into quarters, with one quarter of the rank ratio spectrum comprising the pure growth assets and another quarter of the rank ratio spectrum comprising the pure value assets and using a specified minimum score of less than 0.25 (e.g., 0.10 or 0.15) can provide indices based on adequate numbers of assets while avoiding assets which are barely pure growth or barely pure value. Still alternatively, the candidate pool can be divide into fifths, with one fifth of the rank ratio spectrum comprising the pure growth assets and another fifth of the rank ratio spectrum comprising the pure value assets with no specified minimum score being necessary to "weed out" the barely pure growth and barely pure value assets.

Further, to avoid stocks with outlying high style scores having a very large weight in the index, in one implementation of the present invention, all style scores are capped at 2 (standardized score) in the pure style indices. In other words, for the pure style indices, SV=2.00 if SV>2.00, and SG=2.00 if SG>2.00.

The index may, in one implementation of the invention, be calculated following the divisor-based methodology of the S&P Equal Weight index. The difference, however, is that assets within an index are not weight equally, nor are they weighted according to their respective market capitalizations. On the contrary, the constituent assets are weighted within the index according to their style scores. For example, the Pure Value Index for a candidate pool of assets, such as, for example, the S&P SmallCap 600 Pure Value index, is calculated as follows:

$$\text{Index Level}_t = \frac{\text{Index Market Value}_t}{\text{Index Divisor}_t}$$

$$\text{Index Market Value}_t = \sum_{X=1}^{n} IWF_{X,t} \times \text{Modified Index Shares}_{X,t} \times \text{Price}_{X,t}$$

Where, $IWF_{X,t}$=Investable Weight Factor of stock X on date t.

$Price_{X,t}$=Price used for stock X in parent index computation on date t n=Number of stocks in the candidate pool, such as, e.g., the S&P SmallCap 600 Pure Value index on date t (note that n≦N, the count from above)

Modified Index Shares$_{X,t}$=Shares used for stock X in parent index on date t This term is calculated in the following manner:

Modified Index Shares$_{X,t}$=Index Shares$_{x,t}$×$PWF_{X,t}$

The PWF (pure weight factor)—also termed the score weight factor—term ensures the index weights each stock with its style score. This is accomplished by setting the PWF at the rebalance date d as follows:

$PWF_{X,d}$=k×$SV_x$/($IWF_{x,d}$×Index Shares$_{x,d}$×Price$_{x,d}$)

The constant k is used as a multiplier since $SV_x$/($IWF_{x,d}$×Index Shares$_{x,d}$×Price$_{x,d}$) results in a very small value. Thus, the PWF for each stock in the pure value index is directly proportional to the stock's value score ($SV_X$) and the following ratios: ($IWF_{x,t}$/$IWF_{x,d}$), (Index Shares$_{x,t}$/Index Shares$_{x,d}$), and (Price$_{x,t}$/Price$_{x,d}$). Moreover, the PWF, which is essentially the weight assigned the stock in calculating the index, is dependent on the score (value or growth) without regard to the size (i.e., the market capitalization) of the stock.

In one implementation of the invention, the PWF is set only once a year at rebalancing. Therefore, only at rebalancing will the stocks be weighted in exact proportion to their style scores. The weights of stocks in a pure style index between rebalancings will depend on their relative price performances.

The above calculations are also performed for the pure growth index using values associated with the pure growth constituent stocks including the growth score ($SG_X$) of each constituent stock.

Since pure style indices are score-weighted, weights (and therefore, Modified Index Shares) of individual stocks are not affected by corporate actions such as stock splits, spin-offs and rights offerings. Between rebalancings, the PWF might be adjusted to ensure there is no change in a stock's Modified Index Shares after such a corporate action. This ensures that in practical terms most of corporate actions do not necessitate any action on the part of a portfolio manager tracking the index. Because of this feature, this series has lower number of turnover events in a given year than the Style index series. Further details on how corporate and index actions are handled are described below. For the total return index series, dividends are reinvested in a manner similar to other divisor-based indices.

Style Indices Versus Pure Style Indices

Style indices and Pure Style indices have different characteristics addressing distinct needs. These differences are summarized in the table below. For a more detailed explanation of differences between the two series, including historical data, see the white paper titled "The Next Generation of Style" at www.styleindices.standardandpoors.com.

| Differences between Style Index Series and Pure Style Index Series | | |
|---|---|---|
| Characteristic | Style Index Series | Pure Style Index Series |
| Universe coverage | Exhaustive, all parent index stocks are covered. | Only pure style stocks are covered. |
| Overlapping stocks | Yes. Stocks that do not have pure growth or pure value characteristics have their market capitalization divided between value and growth indices in proportion to their distance from pure regions. | No |
| Weighting scheme | Market capitalization-weighted | Style attractiveness-weighted |
| Breadth | Broader | Narrower |
| Usage | Cost efficient exposure to the broad style market (for example, relative value exposure). | Pure style exposure (for example, deep value exposure) or 'style spread' strategies, quantitative analysis. |

The tables below describe adjustments that should be made to style indices and pure style indices calculated in accordance with the above-describe implementation of the invention in response to changes to the one or more assets (e.g., stocks) in the candidate pool of assets (e.g., the parent index).

| Index Changes for Style Indices | | |
|---|---|---|
| Parent Index Action | Adjustment made to Style Index | Divisor adjustment required? |
| Constituent change | If the constituent being dropped is a member of the Style index, it is removed from the index. $W_V$ and $W_G$ for the replacement stock are computed. If $W_V$ is non-zero the stock is added to the value index: if $W_G$ is non-zero the stock is added to the growth index. The replacement stock can therefore be added to both value and growth indices, or to only one of them. | Yes |
| Share changes between quarterly share adjustments | Share count follows parent index share count. | Yes |
| Quarterly share changes | Share count follows parent index share count. In addition, new $W_V$ and $W_G$ for all constituent stocks change at the periodic (e.g., annual) rebalance, as per formulae discussed above in Paragraph 42. | Yes |
| Spin-off | The price is adjusted to Price of Parent Company minus (Price of Spin-off company/Share Exchange Ratio). | Yes |
| Rights Offering | The price is adjusted to Price of Parent Company minus (Price of Spin-off company/Rights Ratio). | Yes |
| Stock Split (for example, 2:1) | Shares are multiplied by 2, and price is divided by 2. | No |
| Special Dividends | The price of the stock making the special dividend payment is reduced by the per share special dividend amount after the close of trading on the day before ex-date. | Yes |

| | Index Changes for Pure Style Indices | |
|---|---|---|
| Parent Index Action | Adjustment made to Pure Style Index | Divisor adjustment required? |
| Constituent change | If the constituent being dropped is a member of the Pure Style Index, it is removed from the Pure Style Index. The replacement stock can be added to either the pure value or the pure growth index, or to neither. The weight is simply the ratio of the capped style score of the added stock divided by the sum of style scores of all index constituents. (For index computation purposes $PWF_V$ or $PWF_G$ for the new stock are calculated accordingly using the formula in Appendix 2.) | Yes |
| Share changes between quarterly share adjustments | The weight of stocks is unchanged. | No |
| Quarterly share changes | The weight of stocks is unchanged during quarterlies where the index is not being reconstituted. For the periodic rebalance new constituents and their weights are announced 2 to 5 days before the rebalance date. At rebalance, the weight of each stock is simply proportional to its capped style score. | No divisor adjustment There will be a divisor change if the adjustment date coincides with rebalance of Pure Style Index. |
| Spin-off | Weight of stocks is unchanged. Price follows parent index price change. To keep weights of stocks unchanged following price change, Modified Index Shares are adjusted for the stock whose shares are being changed. | No |
| Rights Offering | Weight of stocks is unchanged. Price follows parent index price change. To keep weights of stocks unchanged following price change, Modified Index Shares are adjusted for the stock whose shares are being changed. | No |
| Stock Split (for example, 2:1) | Modified Index Shares are multiplied by 2, and price is divided by 2. | No |
| Special Dividends | Price of the stock making the special dividend payment is reduced by the per share special dividend amount after the close of trading on the day before the ex-date. | Yes |

Appendix I: Calculating Distances from Pure Growth Regions

First, the midpoints of the pure value and pure growth baskets are estimated.

$AV_G$=Average of growth scores of pure value basket members $AV_V$=Average of value scores of pure value basket members $AG_G$=Average of growth scores of pure growth basket members $AG_V$=Average of value scores of pure growth basket members There are four variables but only two distinct definitions . . .

These four variables are calculated once a year at the annual rebalance.

For each stock X that does not belong to a pure basket, $D_{G,X}$ and $D_{V,X}$ are the distances from the pure growth basket and the pure value basket. As before, the stock's growth and value scores are $SG_X$ and $SV_X$.

Calculation of $D_{G,X}$:

If $(SG_X >= AG_G)$, $D_{G,X}$=absolute value of $(SV_X - AG_V)$

Else if $(SV_X <= AG_V)$, $D_{G,X}$=absolute value of $(AG_G - SG_X)$

Else, $D_{G,X}$=Square root of $((SV_X - AG_V)^2 + (AG_G - SG_X)^2)$

Calculation of $D_{V,X}$:

If $(SV_X >= AV_V)$, $D_{V,X}$=absolute value of $(SG_X - AV_G)$

Else if $(SG_X <= AV_G)$, $D_{V,X}$=absolute value of $(AV_V - SV_X)$

Else, $D_{V,X}$=Square root of $((SV_X - AV_V)^2 + (AV_G - SG_X)^2)$

Appendix II: Calculating PWFs for Additions Between Rebalancings

The following equations derive the equations used to calculate the PWFs for additions between rebalancings. Note that index users need not calculate PWFs—Standard & Poor's will announce the weight at which stocks will be added to an index for all additions that are made between rebalancings. The PWFs are simply used in index computation to assign stocks their appropriate weights.

Case 1: One Stock is Being Added to a Pure Style Index

The following are known variables:

$F$ = Float-adjusted market cap of added stock = $P \times IWF \times Index\ Shares$ $s$ = Capped score of stock $X$ being added $S$ = Sum of capped scores of all constituents of the pure style index (including the stock that is being added.)

$I$ = Index Market Value before addition (but after deletions, if applicable) = $\sum_{X=1}^{N} IWF_{X,t} \times Index\ Shares_{X,t} \times PWF_X \times Price_{X,t}$ The following is the unknown variable:

PWF=Weighting factor to ensure the stock goes in at a weight proportional to its style score Because of score weighting, weight of stock in index after addition should be equal to the ratio of its capped style score to that of sum of capped scores of all constituents.

$(F \times PWF)/(I + F \times PWF) = s/S$

Solving for PWF, we get:

$PWF = (I \times s)/[F \times (S - s)]$

Thus, computing the pure weight factor for each added stock includes computing the growth or value score for the stock to be added on the date the stock is to be added. Furthermore, the pure weight factor for each added stock is a function of the index level prior to adding the stock, the number of shares of the added asset available for computing the index (e.g., the float adjusted market capitalization of the stock), the added stock's score, and the sum of all the stocks' scores.

Case 2: Two Stocks are Being Added to a Pure Style Index

Let the variable definitions be the same as above and be denoted by subscripts 1 and 2 for each of the added stocks.

Since stock weights are proportional to their capped style scores, it follows that:

$$(F_1 \times PWF_1)/(F_2 \times PWF_2) = s_1/s_2$$

As before, the weight of an added stock is in proportion to its score. Therefore:

$$(F_1 \times PWF_1)/(I + F_1 \times PWF_1 + F_2 \times PWF_2) = s_1/S$$

Substituting ($F_2 \times PWF_2$) from the first equation into the second, and solving for $PWF_1$:

$$PWF_1 = (I \times s_1)/[F_1 \times \{S - (s_1 + s_2)\}]$$

Similarly, $$PWF_2 = (I \times s_2)/[F_2 \times \{S - (s_1 + s_2)\}]$$

For cases with more than two stocks, the above equation can be extended.

While the invention has been described in connection with exemplary implementations, procedures, and embodiments, it is to be understood that the invention is not to be limited to the disclosed implementations, procedures, and embodiments, but, on the contrary, is intended to cover various modifications and equivalent arrangements included within the spirit and scope of the appended claims.

The invention claimed is:

1. A computer readable medium encoded with computer executable commands, which, when executed by the computer, cause the computer to perform a method for constructing an investment portfolio, comprising commands to:
    (a) access stored data regarding each of a plurality of investment assets;
    (b) compute a first score from a plurality of first score factors for each of the assets;
    (c) compute a second score from a plurality of second score factors for each of the assets;
    (d) rank the plurality of assets in ascending or descending order of the first score;
    (e) rank the plurality of assets in ascending or descending order of the second score;
    (f) for each asset calculate a rank ratio by dividing the asset's rank based on the first score by the asset's rank based on the second score;
    (g) rank the assets in ascending or descending order of the rank ratio;
    (h) select as a first portfolio a first portion of the assets ranked in accordance with step (g), the selected portion comprising assets beginning with the asset listed at a first end of the ranked assets through an asset constituting the last asset of a predefined first portion of the assets.

2. The medium of claim 1, further comprising commands to:
    select as a second portfolio a second portion of the assets ranked in accordance with step (g), the second portion comprising assets beginning with the asset listed at a second end of the ranked assets through an asset constituting the last asset of a predefined second portion of the assets.

3. The medium of claim 2, wherein the predefined first and second portions of the assets are each approximately one-third of the assets.

4. The medium of claim 1, wherein the first score factors comprise the asset's 5-year earnings per share growth rate, 5-year sales per share growth rate, and 5-year internal growth rate, which is calculated by multiplying the earnings retention rate by the ROE, and the second score factors comprise the asset's book value to price ratio, cash flow to price ratio, sales to price ratio, and dividend yield.

5. The medium of claim 1, further comprising commands to, before step (d), standardize the first score for each asset by dividing the difference between the asset's first score and the mean of all assets' first scores by the standard deviation of all assets' first scores and standardize the second score for each asset by dividing the difference between the asset's second score and the mean of all assets' second scores by the standard deviation of all assets' second scores.

6. The medium of claim 1, wherein computing the first score comprises calculating an average of the plurality of first score factors, and computing the second score comprises calculating an average of the plurality of second score factors.

7. A computer readable medium encoded with computer executable commands, which, when executed by the computer, cause the computer to perform a method for constructing an investment portfolio comprising commands to:
    (a) access stored data regarding each of a plurality of investment assets;
    (b) calculate a growth score for each asset as the average of a plurality of growth factors;
    (c) calculate a value score for each asset as the average of a plurality of value factors;
    (d) rank the plurality of assets in ascending order or descending order of the assets' growth scores;
    (e) rank the plurality of assets in ascending or descending order of the assets' value scores;
    (f) for each asset, calculate a rank ratio by dividing the asset's growth rank by its value rank or dividing its value rank by its growth rank;
    (g) rank the assets in ascending or descending order of the rank ratio; and
    (h) select as a growth portfolio a first portion of the assets ranked in accordance with step (g), and selecting as a value portfolio a second portion of the assets ranked in accordance with step (g).

8. The medium of claim 7, wherein step (d) comprises ranking the plurality of assets in descending order of growth scores with a growth score rank of 1 corresponding to the asset with the highest growth score and step (e) comprises ranking the plurality of assets in descending order of value scores with a value score rank of 1 corresponding to the asset with the highest value score.

9. The medium of claim 8, wherein step (f) comprises calculating a rank ratio for each asset by dividing the asset's growth score rank by its value score rank.

10. The medium of claim 9, wherein step (g) comprises ranking the assets in ascending order of the rank ratio, with a rank ratio rank of 1 corresponding to the asset with the lowest rank ratio, and the first portion of the assets comprising the growth portfolio consists of a predetermined fraction of the assets including the asset with a rank ratio rank of 1 and the second portion of the assets comprising the value portfolio consists of a predetermined fraction of the assets including the asset with the highest rank ratio rank.

11. The medium of claim 9, wherein step (g) comprises ranking the assets in descending order of the rank ratio, with a rank ratio rank of 1 corresponding to the asset with the highest rank ratio, and the first portion of the assets comprising the growth portfolio consists of a predetermined fraction of the assets, including the asset with the highest rank ratio rank and the second portion of the assets comprising the value portfolio consists of a predetermined fraction of the assets including the asset with a rank ratio rank of 1.

12. The medium of claim 8, wherein step (f) comprises calculating a rank ratio for each asset by dividing the asset's value score rank by its growth score rank.

13. The medium of claim 12, wherein step (g) comprises ranking the assets in ascending order of the rank ratio, with a rank ratio rank of 1 corresponding to the asset with the lowest rank ratio, and the first portion of the assets comprising the growth portfolio consists of a predetermined fraction of the assets including the asset with the highest rank ratio rank and the second portion of the assets comprising the value portfolio consists of a predetermined fraction of the assets including the asset with a rank ratio rank of 1.

14. The medium of claim 12, wherein step (g) comprises ranking the assets in descending order of the rank ratio, with a rank ratio rank of 1 corresponding to the asset with the highest rank ratio, and the first portion of the assets comprising the growth portfolio consists of a predetermined fraction of the assets including the asset with a rank ratio rank of 1 and the second portion of the assets comprising the value portfolio consists of a predetermined fraction of the assets including the asset with the highest rank ratio rank.

15. The medium of claim 7, wherein step (d) comprises ranking the plurality of assets in ascending order of growth scores with a growth score rank of 1 corresponding to the asset with the lowest growth score and step (e) comprises ranking the plurality of assets in ascending order of value scores with a value score rank of 1 corresponding to the asset with the lowest value score.

16. The medium of claim 15, wherein step (t) comprises calculating a rank ratio for each asset by dividing the asset's growth score rank by its value score rank.

17. The medium of claim 16, wherein step (g) comprises ranking the assets in ascending order of the rank ratio, with a rank ratio rank of 1 corresponding to the asset with the lowest rank ratio, and the first portion of the assets comprising the growth portfolio consists of a predetermined fraction of the assets including the asset with the highest rank ratio rank and the second portion of the assets comprising the value portfolio consists of a predetermined fraction of the assets including the asset with a rank ratio rank of 1.

18. The medium of claim 16, wherein step (g) comprises ranking the assets in descending order of the rank ratio, with a rank ratio rank of 1 corresponding to the asset with the highest rank ratio, and the first portion of the assets comprising the growth portfolio consists of a predetermined fraction of the assets including the asset with a rank ratio rank of 1 and the second portion of the assets comprising the value portfolio consists of a predetermined fraction of the assets including the asset with the highest rank ratio rank.

19. The medium of claim 15, wherein step (f) comprises calculating a rank ratio for each asset by dividing the asset's value rank by its growth rank.

20. The medium of claim 19, wherein step (g) comprises ranking the assets in ascending order of the rank ratio, with a rank ratio rank of 1 corresponding to the asset with the lowest rank ratio, and the first portion of the assets comprising the growth portfolio consists of a predetermined fraction of the assets including the asset with a rank ratio rank of 1 and the second portion of the assets comprising the value portfolio consists of a predetermined fraction of the assets including the asset with the highest rank ratio rank.

21. The medium of claim 19, wherein step (g) comprises ranking the assets in descending order of the rank ratio, with a rank ratio rank of 1 corresponding to the asset with the highest rank ratio, and the first portion of the assets comprising the growth portfolio consists of a predetermined fraction of the assets including the asset with the highest rank ratio rank and the second portion of the assets comprising the value portfolio consists of a predetermined fraction of the assets including the asset with a rank ratio rank of 1.

22. A computer readable medium encoded with computer executable commands, which, when executed by the computer, cause the computer to perform a method for computing an index level for a plurality of investment assets, comprising commands to:

for each of the assets (X), derive a score ($S_x$) from two or more score factors;

on a rebalance date (d) and for each of the assets (X), determine a price ($P_{x,d}$) and a number of shares ($N_{x,d}$);

on each date (t) for which the index level is to be computed and for each of the assets (X), determine a price ($P_{x,t}$) and a number of shares ($N_{x,t}$); and compute the index level on date (t) based on the sum, over the plurality of investment assets, of each asset's price ($P_{x,t}$) multiplied by a modified number of shares for each asset, wherein the modified number of shares for each asset is proportional to $[(N_{x,t})(S_x)]/[(N_{x,d})(P_{x,d})]$ such that the weight of asset (X) in the index level computed on date (t) is reflective of the score (Sx), without regard to the market capitalization of asset (X).

23. The medium of claim 22, wherein the score factors are factors indicative of whether the asset should be characterized as a value investment or a growth investment.

24. The medium of claim 23, wherein the score factors comprise the 5-year earnings per share growth rate, the 5-year sales per share growth rate, and the 5-year internal growth rate, which is calculated by multiplying the earnings retention rate by the ROE for each asset.

25. The medium of claim 23, wherein the score factors comprise the book value to price ratio, the cash flow to price ratio, the sales to price ratio, and the dividend yield of each asset.

26. The medium of claim 22, wherein the step of deriving the score ($S_x$) comprises standardizing the score for each asset by dividing the difference between the asset's score and the mean of all assets' scores by the standard deviation of all assets' scores.

27. The medium of claim 22, wherein deriving the score ($S_x$) comprises calculating an average of the plurality of score factors.

28. The medium of claim 22, wherein the rebalance date (d) recurs periodically.

29. The medium of claim 28, further comprising commands to compute a score weight factor for each of one or more assets added to the plurality of assets between the periodic rebalance dates, wherein computing the score weight factor for each added asset comprises deriving a score from the plurality of score factors for each asset to be added on the date the asset is to be added and wherein the score weight factor for each added asset is a function of the index level prior to adding the added asset, the number of shares of the added asset available for computing an index, the derived score for the asset to be added, and the sum of the derived scores for all assets of the index.

30. A computer readable medium encoded with computer executable commands, which, when executed by the computer, cause the computer to perform a method for computing an index of investment assets, comprising commands to:

(a) compute a first score from a plurality of pre-programmed first score factors for each of a plurality of assets and store the first scores on storage media accessible to the computer;
(b) compute a second score from a plurality of pre-programmed second score factors for each of the assets and store the second scores on storage media accessible to the computer;
(c) rank the plurality of assets in ascending or descending order of the first scores and store each asset's first score rank on storage media accessible to the computer;
(d) rank the plurality of assets in ascending or descending order of the second scores and store each asset's second score rank on storage media accessible to the computer;
(e) for each asset, calculate a rank ratio by dividing the asset's first score rank by the asset's second score rank and store the rank ratio for each asset on storage media accessible to the computer;
(f) rank the assets in ascending or descending order of the rank ratio and store the rank ratio rank on storage media accessible to the computer;
(g) select as a first portfolio a first portion of the assets ranked according to the rank ratio, the selected portion comprising assets beginning with the asset listed at a first end of the ranked assets through an asset constituting the last asset of a predefined first portion of the assets; and
(h) compute an index level for the assets of the first portfolio based on the sum, over the assets of the first portfolio, of each asset's price multiplied by a modified number of shares for each asset, wherein the modified number of shares for each asset is proportional to the first score for the asset.

31. The medium of claim 30, further comprising commands to:
(i) select as a second portfolio a second portion of the assets ranked in accordance with step (f), the second portion comprising assets beginning with the asset listed at a second end of the ranked assets through an asset constituting the last asset of a predefined second portion of the assets; and
(j) compute an index level for the assets of the second portfolio based on the sum, over the assets of the second portfolio, of each asset's price multiplied by a modified number of shares for each asset, wherein the modified number of shares for each asset is proportional to the second score for the asset.

32. The medium of claim 31, wherein the modified number of shares for the first portfolio is computed by multiplying the number of shares of the asset available for calculating an index by a score weight factor calculated periodically for the asset based on the derived first score for the asset, and the modified number of shares for the second portfolio is computed by multiplying the number of shares of the asset available for calculating an index by a score weight factor calculated periodically for the asset based on the derived second score for the asset.

33. The medium of claim 32, further comprising commands to compute a score weight factor for each of one or more assets added to the first or second portfolio between the periodic calculations of the score weight factors for the remaining assets, wherein computing the score weight factor for each added asset comprises deriving a first or second score from the plurality of first or second score factors for each asset to be added on the date the asset is to be added and wherein the score weight factor for each added asset is a function of the index level for the first or second portfolio prior to adding the asset to the first or second portfolio, the number of shares of the added asset available for computing an index, the derived first or second score for the asset to be added, and the sum of the derived first or second scores for all assets of the index for the first or second portfolio.

34. The medium of claim 30, wherein the first score factors are factors indicative of whether the asset should be characterized as a growth investment and the second score factors are factors indicative of whether the asset should be characterized as a value investment.

35. The medium of claim 31, wherein the first score factors comprise the 5-year earnings per share growth rate, the 5-year sales per share growth rate, and the 5-year internal growth rate, which is calculated by multiplying the earnings retention rate by the ROE for each asset, and the second score factors comprise the book value to price ratio, the cash flow to price ratio, the sales to price ratio, and the dividend yield of each asset.

36. The medium of claim 30, further comprising commands to, before step (s), standardize the first score for each asset by dividing the difference between the asset's first score and the mean of all assets' first scores by the standard deviation of all assets' first scores and standardize the second score for each asset by dividing the difference between the asset's second score and the mean of all assets' second scores by the standard deviation of all assets' second scores.

37. The medium of claim 30, wherein computing the first score comprises calculating an average of the plurality of first score factors, and computing a second score comprises calculating an average of the plurality of second score factors.

* * * * *

UNITED STATES PATENT AND TRADEMARK OFFICE
CERTIFICATE OF CORRECTION

PATENT NO. : 7,593,878 B2  Page 1 of 1
APPLICATION NO. : 11/435924
DATED : September 22, 2009
INVENTOR(S) : Blitzer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 433 days.

Signed and Sealed this

Twenty-eighth Day of September, 2010

David J. Kappos
*Director of the United States Patent and Trademark Office*